United States Patent [19]

Barnett

[11] Patent Number: 5,439,322
[45] Date of Patent: Aug. 8, 1995

[54] ASBESTOS ABATEMENT

[76] Inventor: Irvin Barnett, P.O. Box 27209, San Diego, Calif. 92198-1209

[21] Appl. No.: 151,942

[22] Filed: Nov. 15, 1993

[51] Int. Cl.⁶ .......................... A62D 3/00; B09B 3/00
[52] U.S. Cl. .................... 588/254; 252/79.2; 423/167.1; 427/385.5; 405/128; 405/129
[58] Field of Search ............... 588/249, 254; 405/128, 405/129; 423/167.1; 427/385.5; 252/79.1, 79.3

[56] References Cited

U.S. PATENT DOCUMENTS

| | | | |
|---|---|---|---|
| 4,921,626 | 5/1990 | Rhodenbaugh | 252/79.3 X |
| 5,040,925 | 8/1991 | Holton et al. | 405/129 |
| 5,041,277 | 8/1991 | Mirick | 423/167.1 X |
| 5,258,131 | 11/1993 | Mirick et al. | 588/254 X |
| 5,258,562 | 11/1993 | Mirick et al. | 588/254 X |

FOREIGN PATENT DOCUMENTS

| | | | |
|---|---|---|---|
| 0372084 | 6/1990 | European Pat. Off. | 423/167.1 |
| 4027844 | 3/1992 | Germany | 588/254 |
| 197711 | 11/1977 | U.S.S.R. | 588/254 |

*Primary Examiner*—Dennis L. Taylor
*Attorney, Agent, or Firm*—Ernest D. Buff

[57] ABSTRACT

Asbestos products installed in buildings are treated by application of an aqueous solution that coalesces anti/or encapsulates the asbestos fiber and dust content thereof. Textured asbestos containing materials are thereby rendered safe in an economical, efficient manner by conversion of such fiber and dust to a state permanently immune to flotation in air.

9 Claims, No Drawings

ASBESTOS ABATEMENT

BACKGROUND OF THE INVENTION

1. Field of the Invention

This invention relates to the treatment of asbestos products installed in buildings; and more particularly, to a method for coalescing and/or encapsulating the asbestos fiber and dust content of textured ceiling materials to a state permanently immune to flotation in air.

2. Description of the Prior Art it has been established that asbestos fiber is potentially a carcinogenic material when inhaled, and that inhalation of such fiber, at minimum, can cause lung impairment, referred to as asbestosis, an incurable, but nonprogressive serious disease. The inhalation of asbestos fibers typically occurs in facilities wherein disruption of asbestos containing products presents an atmosphere containing airborne fibers having transverse dimensions below about 0.25 mm (0.01 in.), although presently only those fibers less than 3 microns in width having a length greater than 5 microns are considered to be a threat to health.

The Asbestos Hazard Emergency Response Act, enacted by Congress in 1986, led to promulgation of plans for safe and efficient ways to (1) remove, (2) encapsulate or (3) safely maintain materials containing asbestos installed in all school buildings. In addition, various local governmental mandates now require asbestos abatement in practically all buildings other than private homes.

The abatement activities that followed the various mandates have focused primarily on the first option. The second and third options are basically related in that effectively encapsulating the asbestos content would also satisfy the third option.

Although by far the most expensive approach, the removal option has been chosen for two reasons. One is technical and the other is psychological. Structural building components containing asbestos fiber have heretofore not been susceptible to penetration with a binder to a depth sufficient to coalesce or encapsulate the fiber and dust therein. The problem of penetration is particularly troublesome with asbestos fiber containing ceiling materials, which are relatively dense. Another problem is the inherent filtering property of asbestos. Prior to being banned in the U.S., asbestos was used in industrial processes, such as wine making and gasoline refining, as a filtering medium. In addition, since asbestos has not been legally permitted in domestic ceiling installation for at least twenty years, many ceilings containing asbestos fiber have been painted one or more times with a flat vinyl paint. This treatment provides the ceiling with a barrier which operates to prevent penetration thereof with a binder.

The psychological reason for selecting the removal option is readily apparent. Owners or occupants of buildings in which structural components contain asbestos fiber want those components removed from the premises to avoid the risk of potential liability or actual health problems caused by insufficient treatment or fire.

Whether mandated by law or determined to be financially justified to upgrade the property value for resale, refinance, or rental purposes the costly removal program is the predominant course pursued. One factor contributing to the high asbestos removal cost are the regulations promulgated by federal and state environmental protection agencies. These regulations require a procedure wherein the premises are sealed up, after which operators in "space suits" remove the texture from a ceiling substrate while wetting with water. Upon removal, the material is packaged and then hauled to a certified disposal dump for toxic materials, sometimes located hundreds of miles away. Inasmuch as the wetting of the texture with water serves only to facilitate its separation from the substrate, the protection provided by this procedure against the presence of airborne asbestos fiber is inadequate. Rather, airborne asbestos fiber is often times extant during the removal process owing to the formation of pockets of dry material in the texture. In addition, health risks involved in removing asbestos containing materials by this method are substantial, with the result that expensive liability insurance is either required or desired on most jobs.

SUMMARY OF THE INVENTION

The present invention provides for the treatment of asbestos products installed in a buildings by application of an aqueous solution; and to a method for coalescing and/or encapsulating the asbestos fiber and dust content of textured asbestos containing materials to cause such fiber and dust to assume a state in which they are rendered permanently immune to flotation in air.

Specifically, the present invention provides an aqueous solution for treating an asbestos fiber containing material, comprising: an acid that reacts with carbonates and oxides in the material; a binder; a surfactant for increasing wettability, decreasing viscosity, and immunizing the binder from coagulating in the acid; and a coalescent for merging the binder into a film on drying of the solution; whereby the solution penetrates the asbestos fiber containing material upon application thereof, causing coalescence or encapsulation of the asbestos fiber to a state immune to flotation in air.

In addition, the invention provides a method for treating asbestos fiber containing material, such as textured ceilings and walls, fixedly mounted on a structural component of a building, comprising the steps of: (a) contacting such material with the aqueous solution defined in the preceding paragraph; and (b) removing the material from the structural component without releasing airborne asbestos fibers or dust therefrom.

Further there is provided a process for treating asbestos fiber containing material fixedly mounted on a structural component of a building, comprising the steps of: (a) applying to the asbestos fiber containing material an aqueous solution comprising an acid, binder, surfactant, and coalescent; (b) reacting of the acid with carbonates and oxides to thereby produce gases that open the structure of the material permitting the binder to penetrate the material and encapsulate the asbestos fiber; and (c) drying the binder to coalesce the encapsulated fiber.

The present invention provides a method for economically and safely treating installed asbestos material, such as textured ceilings, to prevent the release of airborne fibers and dust during the removal thereof in either the wet or dry stage. This is accomplished by applying a unique formulation containing an acid that reacts with the carbonates and oxides in the plaster content of the texture material as well as with similar compounds normally found in latex paint (which is often times present on the surface of the textured material), and a thermoplastic resin binder that has been immunized from premature coagulation in the presence of acids.

DESCRIPTION OF PREFERRED EMBODIMENTS

The present invention provides a method for economically and safely treating installed asbestos materials, such as textured ceilings, to prevent the release of airborne fibers and dust during the removal in either the wet or dry stage. This is accomplished by applying a unique formulation that contains an acid that reacts with the carbonates and oxides in the plaster content of the texture material as well as with similar compounds normally found in latex paint, and a thermoplastic resin binder that has been immunized from premature coagulation in the presence of acids.

To overcome the problem of penetrating asbestos products to an effective depth with a binder to coalesce or encapsulate all of the fiber and dust content a common acid, such as dilute hydrochloric or acetic, can be applied to the texture to react with the carbonates and oxides and thereby loosen the relatively compact structure thereof. In addition application of such acid operates to form carbon dioxide gas as one of the reaction products. Generation of gases within the texture mildly "explodes" the structure prior to dissipation, and in doing so, temporarily opens the structure for effective penetration of a binder. Most of the thermoplastic resin emulsions selected on the basis of cost and performance characteristics are in an alkaline vehicle, and are instantly coagulated in the presence of acids.

A surfactant is used because it increases the wettability of acrylic emulsions appointed for application to cementitious and plaster substrates. Acids typically coagulate acrylic polymers. It has been discovered that a certain surfactant, namely, an emulsion of octyl phenopolyethoxy ethanol, "immunizes" the formulation containing the acrylic polymer from coagulating upon the subsequent introduction of even strong hydrochloric or acetic acids. The chemistry of why this occurs has not yet been identified.

Utilization of a formulation in which the acid and the resin binder coexist permits the acid to perform its function as described above, while the included resin effectively penetrates the texture material to encapsulate and coalesce the asbestos content thereof.

In addition to rendering the asbestos product environmentally safe for insitu removal, the process of this invention affords a further advantage. The removed material is especially suited to be upgraded from a "Friable" to a "non-Friable" asbestos product for classification relative to disposal procedures and sites.

The asbestos products to be treated have no firm specifications from one location to another. Accordingly, precise parameters for the quantity of treatment to be applied are not readily specified. The formulation, method of application, and method of removal remains constant. Among installations, the asbestos content of ceiling texture typically varies from 3% to 18%. There is additional variation in thickness of texture and the amount of applied paint.

The selection of the particular acrylic polymer emulsion used as the binder was based on its proven compatibility and effectiveness with cementitious and plaster materials in forming a tough, flexible, waterproof film at an affordable cost.

In selecting the acid to be used in the formulation, acetic is clearly preferred over hydrochloric. Unlike hydrochloric acid, the weak concentration of acetic acid used in the process avoids problems relative to handlers and spray equipment, as well as the removed, treated material or remaining substrate due to unspent acid.

Asbestos has not been used in textured ceilings for at least twenty years, with the result that the ceilings to be treated often times contain an oily film or deposit, especially, in localities where oil heat is used, and/or the ceilings have been painted one or more times. Unless the surface of the ceiling is pretreated to enhance rapid absorption of aqueous products, the spraying of binder emulsion tends to result in excessive drip unless many very light applications are made. Avoidance of such time consuming procedures is accomplished through use of a simple effective spray composed of a pretreatment, as described hereinafter in the Examples.

The following examples are presented to provide a more complete understanding of the invention. The specific techniques, conditions, materials and reported data set forth to illustrate the principles and practice of the invention are exemplary and should not be construed as limiting the scope of the invention.

EXAMPLE I

Textured ceiling was treated, which contained about 12% asbestos fibers and had at least once been painted with a flat vinyl latex.

Step 1

A pretreatment was prepared by mixing together the following ingredients:

0.96.5 gal 10% Acetic acid;

3.5 gal Alkyl Polyethylene Glycol Ether (wetting agent)

The pretreatment was applied at the rate of about 40 sq. ft. per gallon with a pump sprayer set at fine mist and emission pressure at 20 psi. This procedure prevented premature disruption of the fragile texture. Before proceeding with Step 2 the generated gases were allowed to dissipate and the liquid was allowed to be absorbed by the sheet-rock substrate. This required about 45 minutes.

Step 2

A binder formula was prepared by mixing together each of the following ingredients. For optimum results, each of the ingredients should be added in the order that they are listed.

31 gal Rhoplex AC-630 (Rohm & Haas Co.- all-acrylic polymer 50% solids)

10 gal water;

5 gal Triton X-405 (Spectrum Chem.- Octyl phenopolyethoxy ethanol emulsion diluted to 30% solids);

4 gal Ethylene Glycol Monobutyl Ether (100% solids); and 50 gal 10% Acetic Acid.

The binder was applied at the rate of about 24 sq. ft. per gallon using the same equipment and procedure employed during application of the pretreatment in Step 1.

STEP 3

The treated texture was removed while wet and, subsequently, tested in essentially bone-dry condition to determine the effectiveness of the binder in preventing airborne fiber when subjected to air attrition. If the material passed this test under circumstances wherein it would be most vulnerable to the attrition, then it would be reasonable to conclude that any condition of moisture content above bone-dry would also pass.

Before removing the treated texture, time was allowed for all of the residual gases to dissipate and excess water to be absorbed by the sheet-rock. This condition was easily identified by the collapse of the texture to a somewhat dense state and its assumption of a slightly tacky surface. The time required to achieve this condition was about one hour under conditions of 78° F. and 50% R.H. The material was removed from the sheet-rock with a broad-knife and allowed to dry for subsequent evaluation.

EXAMPLE II

A ceiling texture was treated using the procedure set forth in Example I, but removal was delayed until a later time, so that the treated material could be stripped from its substrate in sheet form and disposed without the release of airborne asbestos fiber or dust. The material that was treated was identical to that used in Example I, and the treatment was carried out using the pretreatment and binder described in Example I

STEP 3

Following the treatment in STEP 2, the texture was allowed to dry sufficiently to lose tackiness and develop a somewhat firm surface. This was necessary to prevent disruption of the texture when the final coat of a high solids content viscous acrylic emulsion (Rohm & Haas-Rhoplex Multilobe 200) was applied with brush.

In practice, the waiting time could be reduced and the final coat applied by spray. The emulsion used in this example was applied at a rate of about 95 sq. ft. per gallon.

STEP 4

After the final coat of resin had fully dried and developed film strength, which required about 24 hours, the material was stripped from the sheet-rock and samples were taken for evaluation.

Test Results

The treated material was evaluated to determine whether the asbestos content had been prevented from becoming airborne during disruption. Apparatus was designed and assembled to conduct comparison tests using untreated material as a control.

The equipment comprised a small glass aeration chamber having an inlet of controlled compressed air and a filtered outlet at the top thereof. Material to be tested was placed on the bottom of the chamber and subjected to impingement of air for a defined period of time from a small jet placed 3 inches above the sample. Particles that became dislodged and airborne were subjected to sampling as they rose to the air filter and landed on microscope slides placed close by. Any fibers remaining on the filter after the inlet air had ceased were dropped onto the slides by vibration. The slides were then carefully covered with a micro cover glass, and viewed under a microscope equipped with a reticule for measuring at 400 magnification.

The conditions of air pressure and time of impingement were set for the control. Air pressure was gradually increased until the attrition disrupted the untreated material as viewed through the glass chamber. This usually occurred before 10 psi was reached. The time of exposure was arbitrarily set at 1 minute, although disruption, if extant, required much less time.

The control conditions were then used for the initial stage of testing the treated samples. If no disruption was observed at this impingement pressure, then it was gradually increased until the limit of the air compressor was reached which, for the unit used, was about 40 psi.

All samples were initially dried to bone-dry condition, and then allowed to regain at ambient conditions prior to testing. Airborne fibers 3 microns and smaller in diameter were reported, since present environmental regulations consider only these fibers to be a threat to health. The results are shown in Table I. The objective sought herein was elimination of all such airborne fibers as a safety factor.

TABLE I

| Material | Air Pressure (psi) | Attrition Time (min.) | Airborne Fibers ≤3 microns dia. | Airborne Fibers >3 microns dia. |
| --- | --- | --- | --- | --- |
| Untreated Texture (control) | 10 | 1 | yes | yes |
| Example I | 10 | 1 | 0 | 0 |
|  | 40 | 1 | 0 | 0 |
| Example II | 10 | 1 | 0 | 0 |
|  | 40 | 1 | 0 | 0 |

Having thus described the invention in rather full detail, it will be understood that such detail need not be strictly adhered to but that further changes may suggest themselves to one having ordinary skill in the art, all falling within the scope of the invention as defined by the subjoined claims.

What is claimed is:

1. An aqueous solution for treating an asbestos fiber containing material comprising:
   a. an acid that reacts with carbonates and oxides in said material;
   b. a binder;
   c. a surfactant for increasing wettability, decreasing viscosity, and immunizing said binder from coagulating in said acid; and
   d. a coalescent for merging said binder into a film on drying of said solution; whereby said solution penetrates said asbestos fiber containing material upon application thereto, causing coalescence or encapsulation of said asbestos fiber to a state immune to flotation in air.

2. An aqueous solution as referred to in claim 1, wherein said binder is a thermoplastic resin, and said resin is an all acrylic polymer or a copolymer.

3. An aqueous solution as referred to in claim 1, wherein said surfactant comprises an emulsifier and octyl phenopolyethoxy ethanol in aqueous solution.

4. An aqueous solution as referred to in claim 1, wherein said coalescent is ethylene glycol monobutyl ether.

5. An aqueous solution as referred to in claim 1, wherein said acid is acetic.

6. A method for treating asbestos fiber containing material fixedly mounted on a structural component of a building, comprising the steps of:
   a. contacting said material with the aqueous lo solution recited by claim 1; and
   b. removing said material from said structural component without releasing airborne asbestos fibers or dust therefrom.

7. A method as recited in claim 6, wherein said structural component is selected from the group consisting of textured ceilings, textured walls, structural steel, and pipe and duct insulation.

8. A process for treating asbestos fiber containing material fixedly mounted on a structural component of a building, comprising the steps of:
   a. applying to said material, an aqueous solution comprising an acid, binder, surfactant, and coalescent;
   b. reacting said acid with carbonates and oxides to thereby produce gases that open the structure of said material, permitting said binder to penetrate said material and encapsulate said asbestos fiber; and
   c. drying said binder to coalesce said encapsulated fibers.

9. A process for treating asbestos fiber containing material fixedly mounted on a structural component of a building, comprising the steps of:
   a. applying to said material an aqueous solution as recited in claim 1; and
   b. applying a thermoplastic resin to the surface of said material.

* * * * *